United States Patent
Lais

(10) Patent No.: US 8,539,686 B2
(45) Date of Patent: Sep. 24, 2013

(54) LEVELING DEVICE AND LEVELING METHOD

(75) Inventor: Josef Lais, Marbach (CH)

(73) Assignee: Leica Geosystems AG, Heerbrugg (CH)

( * ) Notice: Subject to any disclaimer, the term of this patent is extended or adjusted under 35 U.S.C. 154(b) by 258 days.

(21) Appl. No.: 13/203,226

(22) PCT Filed: Feb. 19, 2010

(86) PCT No.: PCT/EP2010/052129
§ 371 (c)(1),
(2), (4) Date: Aug. 24, 2011

(87) PCT Pub. No.: WO2010/097346
PCT Pub. Date: Sep. 2, 2010

(65) Prior Publication Data
US 2012/0011733 A1    Jan. 19, 2012

(30) Foreign Application Priority Data
Feb. 25, 2009 (EP) .................................... 09153608

(51) Int. Cl.
*G01C 1/04* (2006.01)
*G01C 5/00* (2006.01)
*G01B 11/26* (2006.01)

(52) U.S. Cl.
USPC ............................................. 33/292; 356/138

(58) Field of Classification Search
USPC .................... 33/292, 290, 291, 293; 356/138
See application file for complete search history.

(56) References Cited

U.S. PATENT DOCUMENTS

| | | | | |
|---|---|---|---|---|
| 4,030,832 A | * | 6/1977 | Rando et al. | 356/4.08 |
| 4,343,550 A | * | 8/1982 | Buckley et al. | 356/4.01 |
| 4,490,919 A | * | 1/1985 | Feist et al. | 33/290 |
| 5,243,398 A | * | 9/1993 | Nielsen | 356/138 |
| 5,847,400 A | * | 12/1998 | Kain et al. | 250/458.1 |
| 6,023,326 A | * | 2/2000 | Katayama et al. | 356/141.3 |
| 6,237,235 B1 | * | 5/2001 | Feist et al. | 33/295 |
| 6,621,063 B2 | * | 9/2003 | McQueen | 250/208.1 |
| 7,200,945 B2 | * | 4/2007 | Endo | 33/290 |
| 7,503,123 B2 | * | 3/2009 | Matsuo et al. | 33/290 |
| 7,685,725 B2 | * | 3/2010 | Rodriguez et al. | 33/296 |
| 7,930,835 B2 | * | 4/2011 | Svanholm et al. | 33/290 |
| 7,987,605 B2 | * | 8/2011 | Fleenor et al. | 33/293 |
| 2002/0195550 A1 | | 12/2002 | McQueen | |

FOREIGN PATENT DOCUMENTS

| | | |
|---|---|---|
| DE | 33 02 948 A1 | 7/1983 |
| DE | 34 24 806 A1 | 8/1985 |
| DE | 36 18 513 C2 | 1/1987 |

(Continued)

*Primary Examiner* — Christopher Fulton
(74) *Attorney, Agent, or Firm* — Maschoff Brennan

(57) ABSTRACT

A leveling device having a sighting device that defines an alignment axis, an imaging system, spatially separated from the sighting device, having an imaging lens to which a lens primary plane is allocated and a detector having a recording surface lying in an image plane and an evaluation device that is connected to the detector. A visual field of the imaging system is defined by the imaging lens and the detector as the maximum angle range within which points can be registered by the imaging lens by means of the recording surface of the detector. The imaging lens and the detector are designed and arranged relative to one another and to a lens plane comprising the alignment axis such that all points of the lens plane within the visual field are simultaneously imaged in focus on the recording surface of the detector.

16 Claims, 4 Drawing Sheets

(56) References Cited

FOREIGN PATENT DOCUMENTS

| DE | 43 04 815 A1 | 8/1994 |
| DE | 198 04 198 B4 | 8/1998 |
| DE | 198 33 996 C1 | 12/1999 |
| EP | 1 066 497 B1 | 1/2001 |
| EP | 0 808 447 B | 10/2001 |

* cited by examiner

140
LEVELING DEVICE AND LEVELING METHOD

FIELD OF THE INVENTION

The invention relates to a leveling device and a leveling or measuring method.

BACKGROUND

Leveling devices together with measuring rods are used during measurement or leveling. A leveling device comprises a measuring telescope and a device in the form of a spirit level, for example, which ensures the substantially horizontal alignment of the optical axis of the measuring telescope. If the leveling device is mounted on a tripod, then the measurement horizon can be produced using three adjustable foot screws of the tripod by means of the spirit level being leveled. Besides coarse leveling using a box level, it is also possible to carry out fine leveling, wherein a more accurate tubular level, for example, is used. With the aid of a compensator, it is possible to level the target axis of the leveling device even without a precision level. At least part of the residual inclination of the target beam which remains after preliminary leveling using the box level is compensated for by the compensator using the gravitational force. The compensator can attenuate undesirable oscillations with a damping.

When looking through the telescope at the leveling rod, it is possible to determine the perpendicular distance between the rod attachment point and the horizon. Leveling rods have a height of 4 m, for example. An accurate scale is situated at least on a longitudinal region. The zero point of the graduation is the rod attachment point. Various embodiments are known for leveling rods, wherein the latter can have a box level and a handle on the rear side, for example. The rod is kept perpendicular by leveling the spirit level. There are also rods which comprise at least one further graduation.

In combination with digital leveling devices which image the sighted region onto a sensor array and carry out an evaluation of this imaging, corresponding digital leveling rods are used. Such a measuring rod can be automatically read by the device and the data can be evaluated and stored. In order to automate leveling, measuring rods having at least one automatically evaluatable coding are also required—alongside the evaluation and storage elements of the leveling device.

In the case of the known digital leveling devices, the telescope comprises at least one objective, a focusing device, a beam splitter, a cross-line, an eyepiece and a detector comprising the sensor array. With the optical system, a rod can already be read by eye. Since part of the light is deflected in the beam splinter onto a detector for the electronic image conversion, the data can also be detected automatically. The beam splitter can be embodied as a band pass filter e.g. in such a way that spectral ranges of the electromagnetic radiation which are important for the eye are forwarded to the eyepiece and other spectral components are fed to the sensor array.

The measurement sequence is controlled by a processor unit, which not only evaluates the measurement in real time but can also provide corrections dependent on the ambient conditions—for example on temperature—for which purpose various evaluation algorithms are known. Most of these algorithms use a section of the graduation and determine not only the sighted height but also a distance.

The detector converts the received coded pattern of the rod into digital data. Furthermore, the position of the focusing lens is recorded by the focus sensor. The approximate distance between device and rod can be determined from this position. In a distance range of 1.80 m to 100 m, the focusing lens is displaced by approximately 14 mm, for example. In the case of the known solutions, the distance derived from determining the position of the focusing lens is not determined accurately enough. Moreover, the adjustment of the focusing lens is time-consuming.

In the course of measurement using a digital leveling device, in the first step, as in the case of a conventional method, the leveling rod has to be targeted and focused. After the measurement key has been actuated, the position of the focusing lens is registered and the compensator is monitored. In the subsequent step, the target height and the distance are determined approximately. Finally, in the last step, the exact height and the distance are determined by means of evaluation, more particularly correlation, methods. In order to be able to carry out a correlation, it is necessary to store a reference signal corresponding to the imaging of the leveling rod. The height can be determined, for example, by the measurement signal being shifted until reference signal and measurement signal correspond as well as possible. The shift in the measurement signal corresponds to the height sought. Since the measurement signal is imaged at different magnitudes depending on the distance, the scale of the measurement signal has to be matched to the scale of the reference signal beforehand.

Digital leveling devices are known for example from the patent documents DE 36 18 513 C2, DE 198 33 996 C1, EP 1 066 497 B1 and DE 198 04 198 B4, wherein the detectors in the last two documents comprise two-dimensional sensor arrays. EP 0 066 497 B1 describes an evaluation method wherein a slanted position of the measuring rod is determined or compensated for. Moreover, an additional distance measuring device is proposed for accurately determining distance, which increases the device and evaluation outlay. DE 198 04 198 B4 describes embodiments in which the image signals are evaluated by means of Fourier transformations, which improves the correlation with the reference signal of the measuring rod.

EP 0 808 447 describes a device in which the imaging optical unit has a plurality of differently imaging pupil zones, to which spatially resolving optoelectronic detectors or partial regions of a spatially resolving optoelectronic detector are assigned, such that the imaging optical unit enables simultaneous imaging from different distance ranges. The construction of this device is relatively complex and there are distance ranges which are not sharply imaged by any pupil zone.

In the case of the known solutions, providing evaluatable information of a sighted measuring rod independently of the distance thereof from the leveling device is complex. Moreover, when determining the height, it is not possible to correct small deviations from the horizontal alignment of the telescope or of the leveling device with a small outlay.

One problem consists, then, in finding a solution with which evaluatable information of a sighted measuring rod can be provided in a simple manner in a large distance range with respect to the digital leveling device. In particular, the imaging optical unit is intended here to be less susceptible to faults, thereby enabling the height information to be determined more robustly and more precisely.

Moreover, as a further, specific problem, the intention is also to enable exact height values to be determined if small deviations from the horizontal alignment of the leveling device occur.

SUMMARY

These problems are solved by the realization of the characterizing features of the independent claims. Features which develop the invention in an alternative or advantageous manner can be gathered from the dependent patent claims.

In a first step of the invention, it has been recognized that the leveling method and the leveling device become simpler if the leveling device has a telescope optical unit and an imaging system spatially separated therefrom and having a dedicated imaging optical unit. The provision of evaluatable information of a sighted measuring rod is thereby separated from the telescope optical unit and, more particularly, from a focusing device of the telescope.

If the telescope is used only for sighting an object (measuring rod section) but not for reading the object information (scale) then it is not necessary for the telescope focusing to be set exactly to the distance from the measuring rod. If appropriate, focusing is dispensed with, which simplifies the measurement sequence. It goes without saying that, if appropriate, a sighting device can then also be used instead of a telescope. The telescope or the sighting device defines at least one telescope axis or sighting axis, which is referred to as alignment axis of the leveling device.

In a second step of the invention, it has been recognized that the measurements carried out with the aid of the imaging system become more robust and more precise if it is not necessary to adjust the focus position of the imaging optical unit and/or of the detector in a manner dependent on a measuring rod distance, since displacing optical components of the imaging system always entails the risk of deviations in the focusing line and, consequently, sequence errors can occur.

In the case of a digital leveling device according to the invention, therefore, the imaging system is arranged in a manner locally separated from the targeting device. In this case, the imaging system has at least one imaging objective, to which an objective principal plane is assigned, and also a detector comprising a recording surface lying in an image plane. In this case, the optical axis of the targeting device, which can be embodied, more particularly, as a telescopic sight, forms an alignment axis, which can be aligned with a measuring rod for the purpose of determining height.

The manner of embodiment and arrangement of the imaging objective and of the detector disposed downstream, a detection range of the imaging system is defined as that angle range within which points situated in the field of view of the imaging system can be imaged on the recording surface of the detector.

The detection range, for which the term field of view is also used synonymously hereinafter, should therefore be understood to mean the maximum angle range of the imaging system within which points can be detected by the imaging objective by means of the recording surface of the detector.

Consequently, a leveling device is involved comprising
an alignment axis, which can be aligned with a measuring rod for the purpose of determining height,
an imaging objective, to which an objective principal plane is assigned,
a detector, comprising a recording surface lying in an image plane, and
an evaluation device, which is connected to the detector.

In this case, the imaging objective can image objects within a detection range onto the recording surface of the detector, and the evaluation device can provide height information with respect to an imaged object using the detector information.

According to the present invention, the imaging objective and the detector are embodied and arranged relative to one another and to an object plane containing the alignment axis in such a way that all points of the object plane which lie within the field of view or the detection range are simultaneously imaged sharply on the recording surface of the detector.

The detector is furthermore connected to an evaluation device, which is designed for determining and providing height information with respect to an object imaged on the recording surface—using the detector information.

By way of example, the effect according to the invention, that all points of the object plane which lie within the detection range are imaged sharply on the recording surface of the detector in a distance-independent manner, can be ensured by the imaging objective having a focal length that varies over the detection range in a manner dependent on the angle of incidence. By way of example, the imaging objective can have an image field curvature in a, more particularly horizontal, axis or a diffractive structure, which produces the angle-dependent—more particularly azimuth-angle-dependent—variation of the focal length of the imaging objective.

As an alternative thereto, the imaging objective and the detector can also be arranged relative to one another and relative to the targeting device or to the alignment axis defined thereby in such a way that the objective principal plane, the image plane and the object plane meet the Scheimpflug condition. By this means, too, it is possible to ensure according to the invention that all points of the object plane that lie within the detection range are imaged sharply on the recording surface of the detector in a distance-independent manner.

In particular, the Scheimpflug condition is met here if the object plane, the image plane and the objective principal plane intersect in a common line or straight line. That is to say that if the objective principal plane, the image plane and the object plane, which comprises the alignment axis, intersect in a common intersection line, the desired sharp imaging of the objects situated in the object plane can be ensured without adjustment outlay during the measurement in a distance-independent manner. An error-insusceptible, robust and nevertheless highly precise detection of the measuring rod code and thus an improved determination of the height information can be made possible as a result.

By comparison with the solutions known from the prior art, the solution according to the invention thus has the advantage that it can carry out a height reading on a sharply imaged code in the case of a change from a first to a further distance without focusing outlay.

With regard to the embodiment of the leveling device according to the invention in which the objective principal plane, the image plane and the object plane intersect in a line, in particular an angle $\alpha$ is formed between the object plane and the objective principal plane and an angle $\beta$ is formed between the objective principal plane and the image plane. The Scheimpflug rule ensures that, in the case of a sharp imaging of a point of the object plane onto the image plane, more particularly onto the recording surface of the detector, all other points of the object plane which are imaged onto the recording surface of the detector are also imaged sharply there.

On the intersection line, the center of the imaging objective is at an objective distance and the center of the recording surface of the detector is at a detector distance. In this case, the two centers can substantially be situated in a common normal plane, comprising the alignment axis, with respect to the intersection line. When there is a small distance between imaging system and telescopic sight, the imaging line runs from a point on the objective plane to an imaged point on the recording surface, that is to say at an acute angle with respect to the alignment axis.

In order to ensure that a desired distance range of the alignment axis is imaged onto the recording surface of the detector, the angles α and β, the objective distance, the detector distance and also the extent of the recording surface of the detector perpendicular to the intersection line have to be chosen correspondingly. In this case, the imaging scale is determined by the choice of the angles α and β. Since the angle α preferably lies in the range of 80° to 90°, and more particularly is substantially 90°, the imaging scale is substantially determined by the angle β.

The imaging scale and the extent of the recording surface of the detector perpendicular to the intersection line are associated with the desired distance range, such that, in the case of a predefined distance range and in the case of a predefined extent of the recording surface of the detector perpendicular to the intersection line, the imaging scale and hence the angle β have to be chosen such that the desired distance range can be imaged onto the recording surface of the detector.

After the choice of an objective distance, the detector distance required for the correct imaging can also be defined in accordance with the desired distance range.

After defining the angles α and β, the objective distance, the detector distance and the extent of the recording surface of the detector perpendicular to the intersection line, it is possible to define the focal length of the imaging objective that is required for sharp imaging. In order that a point of the object plane is imaged by a lens sharply onto a point of the recording surface of the detector, during this imaging the object distance g, the image distance b and the focal length f of the imaging objective or of the lens have to fulfil the lens equation $1/f=1/g+1/b$, such that $f=b*g/(b+g)$ holds true.

With regard to all the embodiments of the invention, the following developments can additionally be employed.

Since the refractive index is dependent on the propagation speed of the light in the lens, color-dependent imaging aberrations arise. This can be taken into account by the coordination of the lens with the color for the coding and/or the choice of the frequency range which is detected by the detector.

The detector preferably comprises a two-dimensional sensor array, which detects the position on the alignment axis for a sharply imaged object in a first direction and height information of the object in a second direction preferably transversely with respect thereto. The position determiniation on the alignment axis corresponds to a triangulation distance measurement and is correspondingly accurate given a fine resolution of the sensor array. The determination of the height information can be carried out in accordance with any desired code evaluation known from the prior art.

Since the distance from the object is known from the triangulation distance measurement and the imaging scale is known from the imaging parameters of the leveling device, the imaged object can be scaled correctly for a comparison with a stored height code, which facilitates the evaluation. The distance determination can be carried out with less outlay than in the case of the solutions in accordance with the prior art, which is a further advantage. In addition, the accuracy of the distance determination can be increased in a simple manner by increasing the resolution of the sensor array in the first direction. If appropriate, the imaging scale is also increased by choosing a larger angle β.

It goes without saying that, in addition, it is also possible to carry out the corrections known from the prior art in the case of a slanted measuring rod.

Likewise, it is possible for the height information, or corresponding code sections, to be arranged transversely with respect to the longitudinal direction of the measuring rod and therefore to be imaged in the first direction of the sensor array.

In the case of such an embodiment, the use of a one-dimensional sensor array may suffice.

The sensor array is embodied as a diode array, for example, but it is also possible to use further areal sensor arrangements known to the person skilled in the art with a read-out in two read-out direction. Preferably, the sensors are areal arrays having a resolution which makes the position of code bars detectable. It is likewise possible to use a transmission device between the recording surface of the detector and the evaluating sensor, which transmission device determines the desired image information by means of a serial imaging of the recording surface onto a sensor with a smaller spatial resolution. A transmission device can, in particular, also merely ensure an optical imaging onto a detector remote from the recording surface.

Since, even when the horizontal alignment of the alignment axis is as accurate as possible, the latter can deviate somewhat from the exact horizontal direction, an inclination sensor is preferably connected to the evaluation device. The inclination sensor determines a deviation angle γ between the alignment axis and a horizontal alignment line in the object plane. The evaluation device determines the height information using the deviation angle γ and the position of the imaged object on the alignment axis. A very high accuracy can thereby be obtained using simple means.

If the region along the alignment axis which is imaged onto the first recording surface of a first detector does not suffice, then it is possible to use at least one further detector, the further recording surface of which lies in a further image plane, which comprises the common intersection line. There is an angle β' between the objective principal plane and the image plane. The imaging onto the second detector is preferably effected by a further imaging objective, to which a further objective principal plane is assigned, which comprises the common intersection line. Alternatively, however, it is also possible to use two imaging objectives and only one detector.

The imaging parameters are chosen such that the further imaging objective images objects of a further detection range onto the further recording surface of the further detector and the evaluation device provides height information with respect to an imaged object using the information of the further detector.

On account of the high measurement accuracy of the leveling device according to the invention, compensation of the refractive index fluctuations in the air gains importance. The compensation can be effected by utilizing dispersion. For this purpose, it is necessary to carry out the same measurement using at least two wavelengths. A theoretical height value in a vacuum can be extrapolated from the measurement differences found.

BRIEF DESCRIPTION OF THE DRAWING

The drawings elucidate the invention on the basis of illustrations concerning the prior art and concerning an exemplary embodiment of the invention. In this case, in the figures.

DETAILED DESCRIPTION

Figure 1:
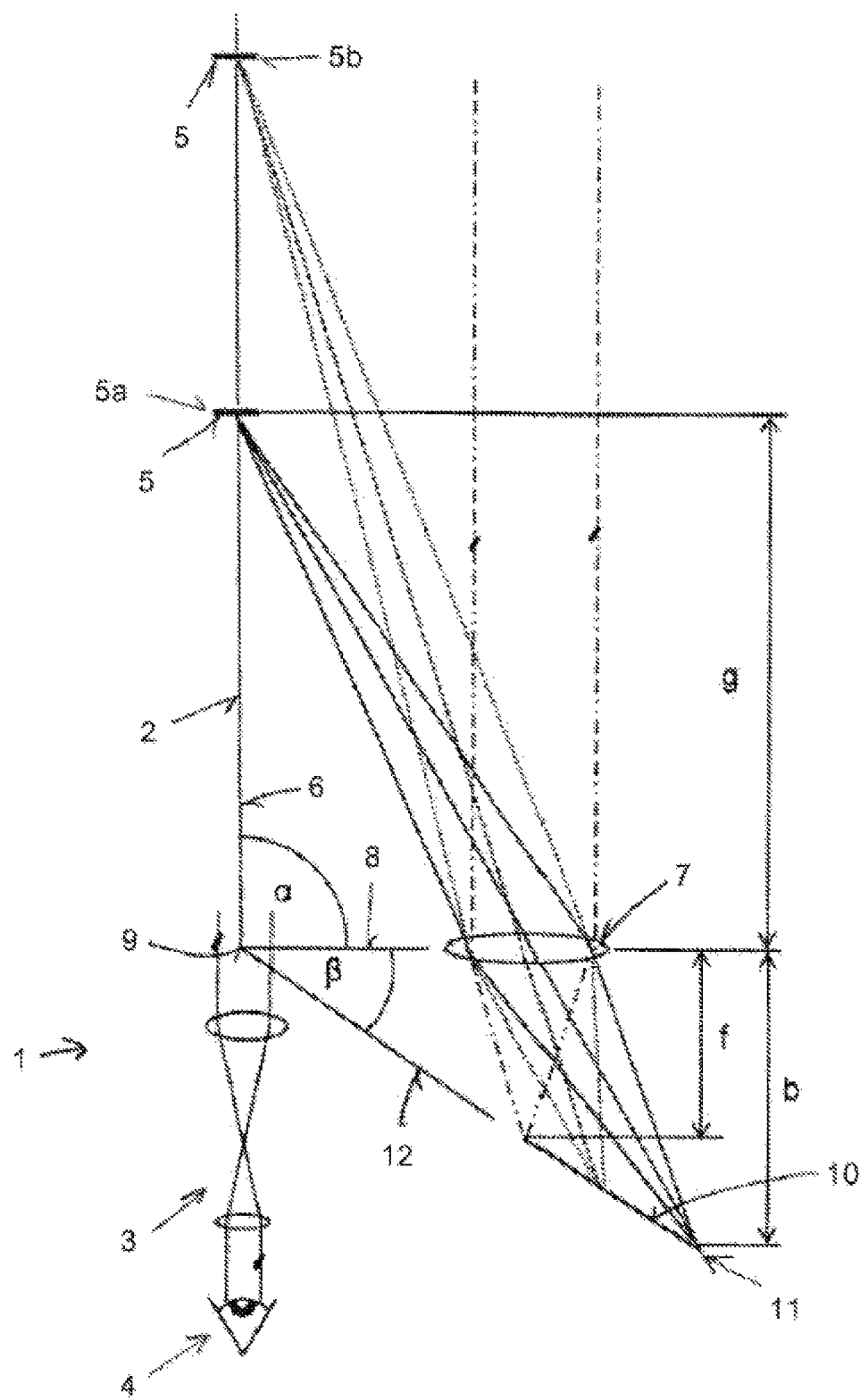
FIG. 1 shows a schematic illustration of a horizontal section through a leveling arrangement in a first embodiment according to the invention.

FIG. 1 shows a first, schematically illustrated example of a leveling device 1 according to the invention, the alignment axis 2 of said device being the axis of a telescope 3 in the embodiment illustrated. A user 4 directs the alignment axis 2 onto a measuring rod 5, which is illustrated at two different positions 5a and 5b on the alignment axis 2. The vertical plane with the alignment axis 2 is designated as the object plane 6.

An imaging objective 7 is illustrated in an objective principal plane 8, which is a vertical plane in the case of a horizontally aligned alignment axis 2. The object plane 6 and the objective principal plane 8 intersect in an intersection line 9 and form the angle α between them.

The recording surface 10 of a detector 11 lies in an image plane 12. The image plane 12 intersects the objective principal plane 8 and the object plane 6 in the intersection line 9. An angle β is formed between the objective principal plane 8 and the image plane 12. This arrangement of the image plane 12, of the objective principal plane 8 and of the object plane 6 with the common intersection line 9 ensures that all objects in the object plane which lie within a distance range are imaged sharply onto the recording surface 10 independently of their position without adjustment outlay, if the sharp imaging is ensured at one position.

The Scheimpflug position is ensured and it is therefore possible to dispense with adjustment of the focusing of the imaging objective 7. In the case of a displacement of the measuring rod 5 from a first position 5a to a further position 5b, it is possible to carry out a height reading on a substantially sharply imaged code without focusing outlay.

The imaging objective 7 images objects of the measuring rod 5 onto the recording surface 10 of the detector 11 and an evaluation device provides height information with respect to an imaged object using the detector information.

From the intersection line 9, the center of the imaging objective 7 lies at an objective distance and the center of the recording surface 10 of the detector 11 is at a detector distance. Both centers are situated substantially in a common normal plane with respect to the intersection line, which normal plane also comprises the alignment axis 2.

In order to ensure that a desired distance range of the alignment axis 2 is imaged onto the recording surface 10 of the detector 11, the angles α and β, the objective distance, the detector distance and the extent of the recording surface 10 of the detector 11 perpendicular to the intersection line 9 have to be chosen correctly. In this case, the imaging scale is determined by the choice of the angles α and β. Since the angle α preferably lies in the range of 80° to 90°, and in the illustrated embodiment is substantially 90°, the imaging scale is substantially determined by the angle β.

The imaging scale and the size of the recording surface 10 of the detector 11 perpendicular to the intersection line 9 are associated with the desired distance range, such that, in the case of a predefined distance range and in the case of a predefined extent of the recording surface 10 of the detector 11 perpendicular to the intersection line 9, the imaging scale and hence the angle β have to be chosen such that the desired distance range can be imaged onto the recording surface.

After the choice of an objective distance, the detector distance required for the correct imaging can also be defined in accordance with the desired distance range.

After defining the angles α and β, the objective distance, the detector distance and the extent of the recording surface of the detector perpendicular to the intersection line, it is possible to define the focal length of the imaging objective that is required for sharp imaging. In order that a point of the object plane 6 is imaged by a lens sharply onto a point of the recording surface 10, during this imaging the object distance g, the image distance b and the focal length f of the imaging objective 7 or of the lens have to fulfil the lens equation $1/f=1/g+1/b$, such that $f=b*g/(b+g)$ holds true.

In the embodiment illustrated, the detector 11 comprises a two-dimensional sensor array arranged directly at the recording surface 10. For a sharply imaged object, the position on the alignment axis 2 is detected in a first direction perpendicular to the intersection line 9 and height information of the object is detected in a second direction preferably transversely with respect thereto. The position determination on the alignment axis 2 thus corresponds to a triangulation distance measurement. The determination of the height information can be carried out in accordance with any desired code evaluation known from the prior art.

Figure 2:
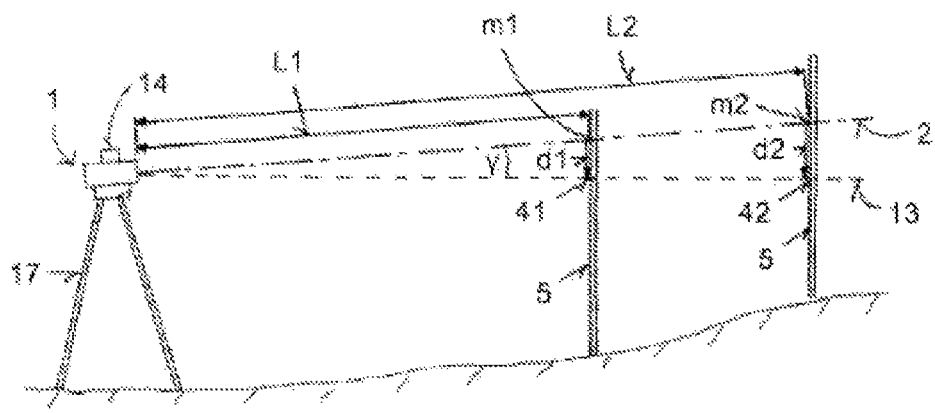
FIG. 2 shows a schematic illustration of a vertical section through a leveling arrangement according to the invention.

FIG. 2 shows an arrangement comprising a leveling device 1 according to the invention, a tripod 17 and a measuring rod 5, in the case of which the alignment axis 2 deviates somewhat from the exact horizontal direction 13. The leveling device 1 comprises an inclination sensor 14, which is connected to the evaluation device. The inclination sensor 14 determines a deviation angle γ between the alignment axis 2 and the horizontal alignment line 13. The height information m1 and m2 at the alignment axis does not correspond to the effective height. The evaluation device determines, from the deviation angle γ and distances L1 and L2, height corrections d1 and d2, respectively, where $d1=L1*\tan(\gamma)$ and $d2=L2*\tan(\gamma)$, respectively. The distances L1 and L2 emerge relatively accurately from the triangulation distance measurement with little outlay. Very accurate height values h1 and h2 can be determined taking account of the height correction d1 and d2, respectively.

Figure 3:
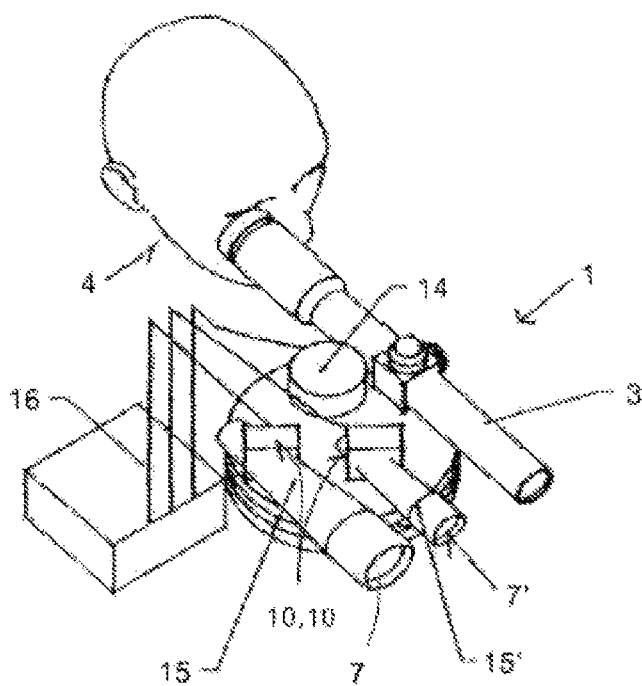
FIG. 3 shows a perspective illustration of a leveling device according to the invention with two imaging systems.

FIG. 3 shows an embodiment of the leveling device 1 with a first and a second imaging optical unit 15, 15', each comprising an imaging objective 7, 7' and a detector 11, 11' having a recording surface. If the region along the alignment axis 2 which is imaged in the first imaging optical unit 15 onto the assigned recording surface does not suffice, then, for a near range, for example, the second imaging optical unit 15' can ensure an imaging onto the assigned recording surface of the further detector 11'. In this case, the second imaging system can likewise be embodied in such a way that all points of the object plane which lie within a detection range are simultaneously imaged sharply on the recording surface of the further detector 11'. By way of example, imaging objective 7' and detector 11'—in a manner corresponding to FIG. 1—can be arranged in a manner meeting the Scheimpflug condition in such a way that the objective principal plane of the imaging object 7', the image plane of the detector 11' and the object plane also intersect in a common straight line.

In particular, it is possible in this case to choose the imaging objectives 7, 7' of the two imaging systems designed for different distance ranges with different focal lengths.

In accordance with an alternative embodiment, however, the two imaging optical units 15, 15' can also be arranged downstream of a common imaging objective 7, wherein the imaging optical units 15, 15' image onto two separate detectors 11, 11', more particularly wherein different angles β and/or different detector distances are chosen.

In accordance with a further alternative embodiment, two different imaging objectives 7, 7' carry out imagings alongside one another onto the same recording surface of a detector. In particular, an angle α which is somewhat less than 90° can be chosen in this case for the alignment of the objective principal plane of the imaging objective directed onto the nearer distance range.

The imaging parameters of the second imaging optical unit 15' are chosen such that objects of a subsequent position region are imaged onto the recording surface of the second detector 11'. An evaluation device 16 can in each case choose the height information of the detector onto whose recording surface an object with height information is imaged.

Figure 4:
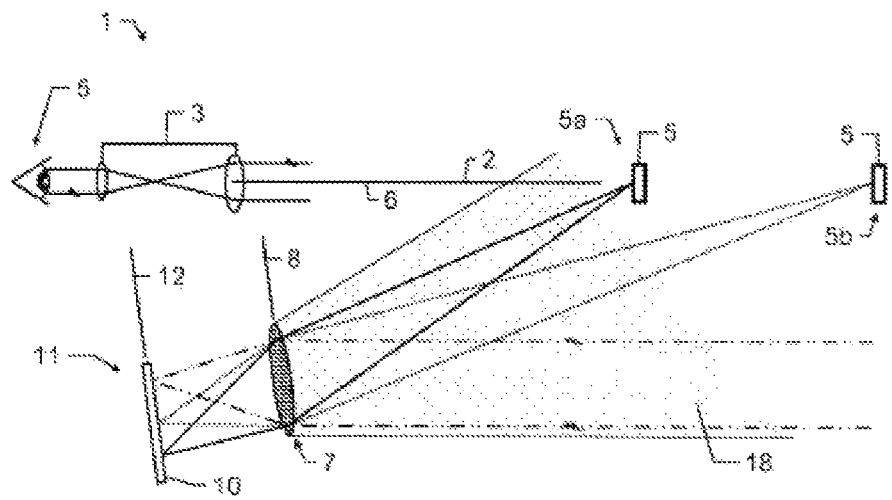
FIG. 4 shows a schematic illustration of a horizontal section through a leveling arrangement in a second embodiment according to the invention.
Figure 5:
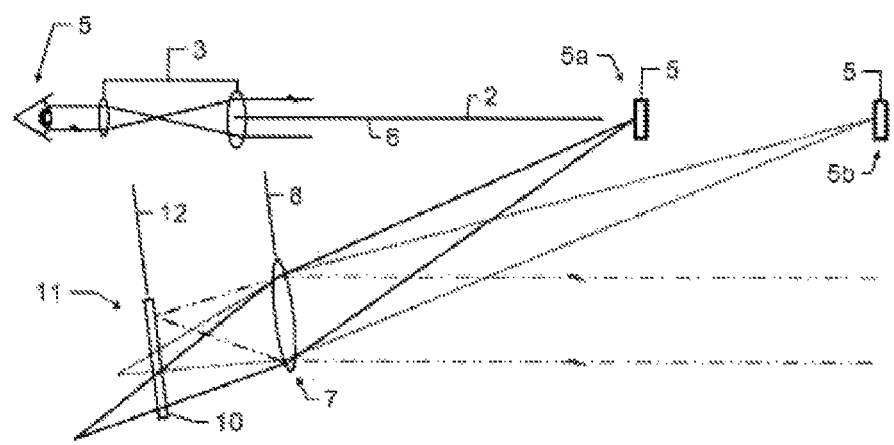
FIG. 5 shows a schematic illustration of a vertical section through a leveling arrangement for elucidating in greater detail the embodiment depicted in FIG. 4.

FIGS. 4 and 5 in each case show a leveling device similar to the leveling device illustrated in FIG. 1.

The digital leveling device 1 according to the invention from FIG. 4 once again has a telescopic sight 3, which is spatially separated from the imaging objective 7 with detector 11 disposed downstream. The optical axis of the telescopic sight 3 defines the alignment axis 2, which, for its part, spans a, more particularly vertical, object plane 6, wherein the alignment axis 2, for the purpose of determining the height of a measurement point, is aligned with a measuring rod 5 set up there. In this case, the measuring rod 5 is illustrated in two possible positions 5a, 5b to be measured.

By virtue of the respective embodiment and arrangement of the imaging objective 7 and of the detector 11 disposed downstream, a detection range is defined as an angle range within which points situated in the field of view of the leveling device can be imaged on the recording surface 10 of the detector 11.

According to the invention, the imaging objective 7 and the detector 11 are embodied precisely and arranged precisely relative to one another and to the telescopic sight 3 defining the object plane 6 in such a way that all points of the object plane 6 which lie within the detection range 18 are simultaneously imaged sharply on the recording surface 10 of the detector 11.

For this purpose, the imaging objective 7 shown in FIG. 4 has a focal length that varies in an angle-dependent manner, more particularly in an azimuth-angle-dependent manner, over the detection range 18.

By way of example, the imaging objective 7 is embodied for this purpose with an image field curvature in a, more particularly, horizontal, axis. Alternatively or additionally, however, the imaging objective 7 can also have a diffractive structure, which produces a variation of the focal length of the imaging objective 7 in a manner dependent on the angle of incidence. Suitable image field curvatures and diffractive structures such as, for instance, a grating structure, such that the imaging objective 7 has a corresponding variation of the focal length in a manner dependent on the angle of incidence, are known to the person skilled in the art and can be chosen accordingly depending on the requirement made of the leveling device.

Purely by way of example, the imaging objective 7 can be arranged relative to the telescopic sight 3 and to the detector in such a way that the object plane 6 and the objective principal plane 8 form an angle α that lies approximately in the range of between 80° and just less than 90°, and that the objective principal plane 8 is aligned approximately parallel to the image plane 12.

The imaging lines proceeding from the measuring rod 5 situated in the first position 5a, said imaging lines being illustrated in solid fashion, in this case impinge on the imaging objective 7 at a first angle of incidence. The imaging lines proceeding from the measuring rod 5 situated in the second position 5b, said imaging lines being illustrated in dotted fashion, impinge, by contrast, on the imaging objective 7 at a second angle of incidence, which differs from the first. The imaging lines coming from infinity, by way of example, said imaging lines being illustrated on the basis of the dash-dot-dot line, impinge on the imaging objective 7 at a third angle of incidence.

As is evident in FIG. 4, then, the imaging objective 7 has a smaller focal length for the first angle of incidence than for the second angle of incidence, and an even smaller focal length for the third angle of incidence than for the second angle of incidence. In particular, therefore, the focal length in this case decreases continuously over the angular profile of the detection range—from the detection range limit facing the alignment axis toward the detection range limit facing away from the alignment axis.

FIG. 5 shows—purely to afford a better understanding of the embodiment according to the invention as illustrated in FIG. 4—the same manner of arrangement of the imaging system components as in FIG. 4, but with a conventionally embodied imaging objective 7 without a focal length that varies in an angle-dependent manner.

As is evident from FIG. 5, then, a conventional imaging objective 7 without a focal length that varies in an angle-dependent manner, in the case of the manner of arrangement of detector 11 and imaging objective 7 as illustrated therein, by contrast, does not permit simultaneous sharp imaging of all points of the object plane 6 which lie within the detection range on the recording surface 10 of the detector 11.

For sharply imaging the measuring rod illustrated in the first position 5a and in the second position 5b, a displacement in each case to a different extent either of the focus position of the imaging objective 7 or of the detector 11 would then be necessary—as in the case of devices from the prior art. However, this entails the risk of deviations in the focusing line, which are also called sequence errors. According to the invention, by contrast—independently of the distance of the sighted measuring rod—only a fixed focus position of the imaging objective 7 or of the detector 11 is provided, such that no error-susceptible displacements of optical components of the imaging system are required.

Figure 6:
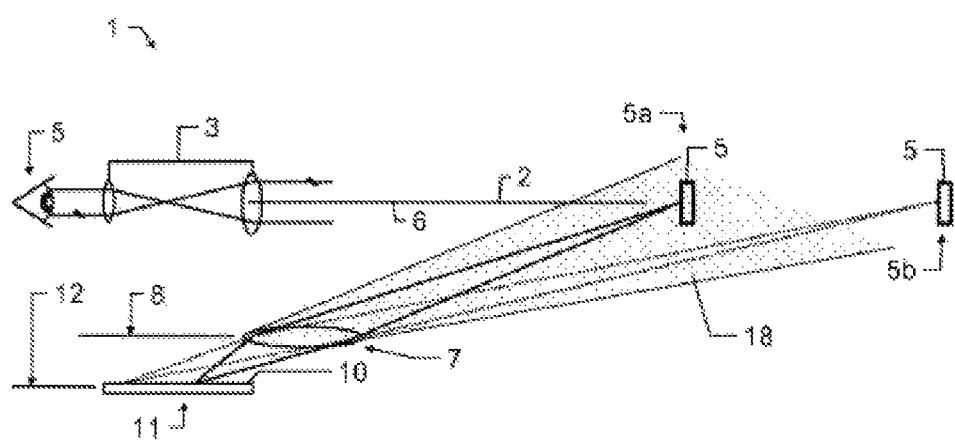
FIG. 6 shows a schematic illustration of a horizontal section through a leveling arrangement in a third embodiment according to the invention.

FIG. 6 shows a further alternative embodiment of a digital leveling device 1 according to the invention, wherein the manner of embodiment and arrangement of the imaging objective 7 and of the detector 11 are designed more particularly for a limiting near range, since the detection range 18 is greatly restricted in this case.

As is evident in FIG. 6, imaging objective 7, detector 11 and telescope 3 are arranged relative to one another in such a way that the objective principal plane 8 and the image plane 12 are aligned parallel to one another and respectively parallel to the object plane 6. Furthermore, the manner of arrangement of imaging objective 7 and detector 11 is chosen in such a way that the optical axes of the imaging objective 7 and of the detector 11, said optical axes being perpendicular to the objective principal plane 8 and image plane 12, respectively, are in this case arranged in a manner offset comparatively far from one another in a parallel fashion.

The imaging objective 7 from FIG. 6 can be embodied—as in accordance with FIG. 1—as a standard lens or standard lens group. That is to say that the imaging objective 7, in the case of this manner of arrangement, in particular, does not have a focal length that varies in a manner dependent on the angle of incidence.

This specific manner of arrangement according to the invention also ensures, then, that all points of the object plane 6 which lie within the detection range 18 are simultaneously imaged sharply on the recording surface 10 of the detector 11. In particular, the Scheimpflug condition is met in the case of this manner of arrangement, too, since image plane 12, principal objective plane 8 and object plane 6 lie parallel to one another.

In this case, the manner of arrangment shown in FIG. 6 can, in particular, also be employed in a leveling device according to the invention with two or more separate imaging systems for respectively different distance ranges. By way of example, according to the invention, it is also possible to provide a leveling device corresponding to that in FIG. 3, wherein, however, the imaging system designed for the near range corresponds to the manner of embodiment and arrangement of imaging objective 7 and detector 11 as shown in FIG. 6. The imaging system designed for the far range can, by contrast, either—as shown for instance in FIG. 1—have a manner of arrangement wherein image plane 12, principal objective plane 8 and object plane 6 intersect in a straight line, or alternatively—in a manner corresponding to FIG. 4—be embodied with an imaging objective 7 having a focal length that varies in a manner dependent on the angle of incidence.

It goes without saying that these figures illustrated merely illustrate possible exemplary embodiments schematically. The different approaches can likewise be combined with one another and with methods from the prior art.

What is claimed is:

1. A leveling device comprising:
    a targeting device, which defines an alignment axis and which can be aligned with a measuring rod for the purpose of determining height;
    an imaging system, which is spatially separated from the targeting device and comprises
    an imaging objective, to which an objective principal plane is assigned; and
    a detector, comprising a recording surface lying in an image plane, wherein a field of view of the imaging system is defined by the imaging objective and the detector as that maximum angle range within which points can be detected by the imaging objective by means of the recording surface of the detector, and
    an evaluation device, which is connected to the detector, wherein:
        height information of the measuring rod at the height of the alignment axis can be provided as a measurement height by the evaluation device using the detector information;
        the imaging objective and the detector are embodied and arranged relative to one another and to an object plane containing the alignment axis in such a way that all points of the object plane which lie within the field of view are simultaneously imaged sharply on the recording surface of the detector; and
        the objective principal plane, the image plane and the object plane are aligned relative to one another in a manner meeting the Scheimpflug condition.

2. The leveling device as claimed in claim 1, wherein the imaging objective and the detector are arranged relative to one another and relative to the alignment axis in such a way that the objective principal plane, the image plane and the object plane, are aligned parallel to one another in a manner meeting the Scheimpflug condition and that the optical axes of the imaging objective and of the detector, respectively, are arranged in a manner spaced apart from one another with an offset, said optical axes being perpendicular to the objective principal plane and image plane.

3. The leveling device as claimed in claim 1, wherein the objective principal plane, the image plane and the object plane intersect in a common intersection line in a manner meeting the Scheimpflug condition, wherein an angle α is formed between the object plane and the objective principal plane and an angle β is formed between the objective principal plane and the image plane.

4. The leveling device as claimed in claim 3, wherein the center of the imaging objective is spaced apart at an objective distance and the center of the recording surface of the detector is spaced apart at a detector distance from the intersection line and both centers substantially lie in a common normal plane with respect to the intersection line, which normal plane also comprises the alignment axis.

5. The leveling device as claimed in claim 3, wherein the angles α and β, the objective distance, the detector distance and the extent of the recording surface of the detector perpendicular to the intersection line are chosen in accordance with a distance range to be imaged on the alignment axis wherein the imaging scale is determined by the choice of the angles α and β.

6. The leveling device as claimed in claim 3, wherein the angles α and β, the objective distance, the detector distance and the extent of the recording surface of the detector perpendicular to the intersection line are chosen in accordance with a distance range to be imaged on the alignment axis wherein the imaging scale is determined by the choice of the angles α and β and the angle a lies in the range of 80° to 90°.

7. The leveling device as claimed in claim 3, wherein the angles α and β, the objective distance, the detector distance and the extent of the recording surface of the detector perpendicular to the intersection line are chosen in accordance with a distance range to be imaged on the alignment axis wherein the imaging scale is determined by the choice of the angles α and β and the angle α is substantially 90°, wherein g is the object distance and b the image distance which correspond to the imaging of a point of the object plane onto a point of the recording surface of the detector, and in that the imaging objective has a focal length f determined by the equation $1/f = 1/g + 1/b$.

8. The leveling device as claimed in claim 1, wherein the detector comprises a two-dimensional sensor array, wherein it is possible to detect the position on the alignment axis in a first direction of the sensor array for a sharply imaged measuring rod section and height information of the measuring rod section in a second direction transversely with respect thereto.

9. The leveling device as claimed in claim 8, wherein an inclination sensor is connected to the evaluation device, wherein the inclination sensor provides a deviation angle γ between the alignment axis and a horizontal alignment line and the evaluation device provides the height information using the deviation angle γ and the position of the imaged measuring rod section on the alignment axis.

10. The leveling device as claimed in claim 1, wherein at least one further imaging system is provided, comprising:
    at least one further detector, the further recording surface of which lies in a further image plane, and
    a further imaging objective, which is disposed upstream of the further detector and to which a further objective principal plane is assigned, wherein:
        the further imaging objective and the further detector are embodied and arranged relative to one another and to the object plane in such a way that all points of the object plane which lie within a field of view of the further imaging system are simultaneously imaged sharply on the further recording surface of the further detector; and the evaluation device provides height information with respect to the imaged measuring rod section using the information of the further detector.

11. The leveling device as claimed in claim 1, wherein the targeting device is embodied as a telescope and the alignment axis is formed by the optical axis of the telescope.

12. A method for leveling using a measuring rod, which comprises height information, and a leveling device as claimed in claim 1, wherein the alignment axis of the leveling device is directed with the aid of the targeting device onto the measuring rod and the height information, determined by the detector and the evaluation device, of the measuring rod at the height of the alignment axis is provided as a measurement height, wherein:

when the measurement height is determined, the imaged height information at least partly lies in the object plane of the leveling device;

the imaging objective and the detector are embodied and arranged relative to one another and to the object plane in such a way that all points of the object plane which lie within the field of view are simultaneously imaged sharply on the recording surface of the detector; and the objective principal plane, the image plane and the object plane are aligned relative to one another in a manner meeting the Scheimpflug condition.

13. The method as claimed in claim 12, wherein:

the object plane, the objective principal plane and the image plane intersect in a common intersection line; or the object plane, objective principal plane and the image plane are aligned parallel to one another and the optical axes of the imaging objective and of the detector, said optical axes being perpendicular to the objective principal plane and image plane, respectively, are arranged in a manner spaced apart from one another with an offset.

14. The method as claimed in claim 12, wherein the detector comprises a two-dimensional sensor array and the position on the alignment axis is detected in a first direction of the sensor array for a sharply imaged measuring rod section and height information of the measuring rod section is detected in a second direction transversely with respect thereto.

15. The method as claimed in claim 14, wherein an inclination sensor detects a deviation angle $\gamma$ between the alignment axis and a horizontal alignment line and the height information is determined using the deviation angle $\gamma$ and the position of the imaged measuring rod section on the alignment axis.

16. The method as claimed in claim 12, wherein the same height measurement is carried out with at least two wavelengths and a theoretical height value in a vacuum is extrapolated from the measurement differences found, such that the effect of refractive index fluctuations in the air is compensated for.

* * * * *

UNITED STATES PATENT AND TRADEMARK OFFICE
CERTIFICATE OF CORRECTION

PATENT NO.        : 8,539,686 B2  
APPLICATION NO.   : 13/203226  
DATED             : September 24, 2013  
INVENTOR(S)       : Josef Lais It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 202 days.

Signed and Sealed this
Fifteenth Day of September, 2015

Michelle K. Lee
*Director of the United States Patent and Trademark Office*